US008468159B2

(12) United States Patent
Abrahams et al.

(10) Patent No.: US 8,468,159 B2
(45) Date of Patent: *Jun. 18, 2013

(54) DATA ELEMENT CATEGORIZATION IN A SERVICE-ORIENTED ARCHITECTURE

(75) Inventors: Faried Abrahams, Laytonsville, MD (US); Ali P. Arsanjani, Fairfield, IA (US); Kerard R. Hogg, Victoria (AU); Ahamed Jalaldeen, Karnataka (IN); Siddharth Purohit, Allen, TX (US); Gandhi Sivakumar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,596

(22) Filed: Aug. 24, 2012

(65) Prior Publication Data

US 2012/0323922 A1  Dec. 20, 2012

Related U.S. Application Data

(63) Continuation of application No. 12/834,958, filed on Jul. 13, 2010, now Pat. No. 8,260,782.

(51) Int. Cl.
*G06F 7/00* (2006.01)

(52) U.S. Cl.
USPC .......................................................... 707/740

(58) Field of Classification Search
USPC .......................................................... 707/740
See application file for complete search history.

(56) References Cited

U.S. PATENT DOCUMENTS

| 6,529,909 | B1 | 3/2003 | Bowman-Amuah |
| 7,707,173 | B2 | 4/2010 | Nanavati et al. |
| 2002/0156641 | A1 | 10/2002 | Kitajima |
| 2002/0170032 | A1 | 11/2002 | Beaven et al. |
| 2004/0215476 | A1 | 10/2004 | Harvey et al. |
| 2005/0086197 | A1* | 4/2005 | Boubez et al. ............ 707/1 |
| 2005/0138065 | A1* | 6/2005 | Ciriza ................... 707/104.1 |
| 2006/0015589 | A1 | 1/2006 | Ang et al. |
| 2006/0112122 | A1* | 5/2006 | Goldszmidt et al. ....... 707/101 |
| 2006/0195476 | A1* | 8/2006 | Nori et al. ............. 707/104.1 |
| 2006/0271563 | A1* | 11/2006 | Angelo et al. ............ 707/100 |
| 2007/0016557 | A1* | 1/2007 | Moore et al. ............. 707/3 |
| 2007/0150480 | A1* | 6/2007 | Hwang et al. ............ 707/10 |
| 2007/0266040 | A1* | 11/2007 | Figlin ...................... 707/102 |
| 2008/0294754 | A1 | 11/2008 | Lu et al. |
| 2009/0138621 | A1 | 5/2009 | Hackmann |
| 2009/0292792 | A1 | 11/2009 | Soulhi et al. |
| 2011/0161921 | A1 | 6/2011 | Garimella et al. |

OTHER PUBLICATIONS

Ge et al.; Service Discovery and Substitution according to Inheritance of Behavior with Invariant Analysis; 2009 Eighth IEEE/ACIS International Conference on Computer and Information Science; Jun. 1-3, 2009; pp. 971-976.

Yin et al.; A Middleware Approach for Behavior Consistent Composition of Services in Smart Space; IEEE International Conference on Service-Oriented Computing and Applications (SOCA'07); Jun. 19-20, 2007; 8 pages.

Notice of Allowance (Mail Date Apr. 25, 2012) for U.S. Appl. No. 12/834,958; Confirmation No. 9406.

* cited by examiner

*Primary Examiner* — Robert Beausoliel, Jr
*Assistant Examiner* — Nirav K Khakhar
(74) *Attorney, Agent, or Firm* — Schmeiser, Olsen & Watts, LLP; John Pivnichny

(57) ABSTRACT

An approach is presented for specifying categories of data elements during a service specification phase of a service-oriented architecture (SOA) life cycle defined in a service modeling methodology like Service-Oriented Modeling and Architecture (SOMA). A Unified Modeling Language based SOA modeling tool for the service modeling methodology includes a middleware based integration plug-in that categorizes service-specific data elements as transaction elements, glue elements, core Common Information Model (CIM) elements, and elements extending the CIM elements, and associates the categorized data elements with corresponding operations of the service being modeled.

20 Claims, 9 Drawing Sheets

DATA ELEMENT CATEGORIZATION IN A SERVICE-ORIENTED ARCHITECTURE

This application is a continuation application claiming priority to Ser. No. 12/834,958, filed Jul. 13, 2010.

FIELD OF THE INVENTION

The present invention relates to a method and system for modeling a service in a service-oriented architecture (SOA) based implementation using a service modeling methodology like Service-Oriented Modeling and Architecture (SOMA), and more particularly to a technique for specifying data level details in a service specification process in a SOA based integration environment.

BACKGROUND OF THE INVENTION

The well-known SOA life cycle defined in a service modeling methodology like SOMA (also referred to herein simply as "life cycle" or "SOA life cycle") may include the following phases: service identification, service specification, service realization, service implementation, and service deployment. The service identification phase includes identifying services using top down, bottom up, meet in the middle, and/or goal service modeling approaches. The service specification phase includes identifying service dependencies, service compositions, service messages and quality of service. The service realization and service implementation phases include an analysis of technical feasibility and the construction and generation of program code. The service deployment phase defines the actual service provisioning process.

The service specification phase is an especially crucial aspect of the aforementioned SOA life cycle because this phase includes designing service interfaces that are eventually exposed to external consumers and that enable the integration of software applications. The known service modeling methods like SOMA specify legacy interfaces and accounting data models and packages during the service specification phase, but these specifications are insufficient for a service designer to develop a robust service interface. Further, the service specification phase of the known SOA life cycle defined in a service modeling methodology like SOMA fails to account for data level details needed for middleware based integration environments, thereby leading to costly and complex service modeling techniques and poorly designed (i.e., non-robust) service interfaces. Thus, there exists a need to overcome at least one of the preceding deficiencies and limitations of the related art.

SUMMARY OF THE INVENTION

The present invention provides a computer-implemented method of specifying categories of data elements during a service specification phase of a service-oriented architecture (SOA) life cycle as defined in a service modeling methodology, such as Service-Oriented Modeling and Architecture (SOMA) methodology. The method comprises:

a computer system retrieving a plurality of data elements specific to a service, wherein the plurality of data elements includes first, second, third and fourth sets of one or more data elements, wherein the plurality of data elements optionally includes a fifth set of one or more data elements, wherein the plurality of data elements optionally includes a sixth set of one or more data elements, and wherein the first, second, third, fourth, fifth and sixth sets of one or more data elements are mutually exclusive;

during the service specification phase of the SOA life cycle as defined in the service modeling methodology (e.g., SOMA), the computer system specifying the first, second, third and fourth sets of one or more data elements as being in a first, second, third and fourth categories, respectively, optionally specifying the fifth set of one or more data elements as being in a fifth category, and optionally specifying the sixth set of one or more data elements as being in a sixth category, wherein the first category specifies transaction elements that provide information required to be sent in a response to a request for the service and that are required for integrating applications, wherein the second category specifies glue elements that associate the operation of the service to middleware elements, wherein the third category specifies core Common Information Model (CIM) elements, wherein the fourth category specifies extension elements that extend the core CIM elements, wherein the fifth category specifies controller elements that include elements selected from the group consisting of context controller elements that control a context of the operation of the service, filter elements that filter data retrieved based on a query of a database, and a combination thereof, and wherein the sixth category specifies extension pattern elements that include patterns selected from the group consisting of: a name-value pattern, a type pattern, a multi level multi type pattern, and combinations thereof; and during the service specification phase of the SOA life cycle, a processor of the computer system generating and initiating storing one or more service specifications of the service based on the first, second, third and fourth sets of one or more data elements being in the first, second, third, and fourth categories, respectively, optionally based on the fifth set of one or more data elements being in the fifth category, and optionally based on the sixth set of one or more data elements being in the sixth category.

A system, program product and a process for supporting computing infrastructure corresponding to the above-summarized method are also described and claimed herein.

Embodiments of the present invention extend the service specification phase of the SOA life cycle as defined in a service modeling methodology such as SOMA to account for all the necessary data elements, thereby reducing the development cost, time and effort required to design a robust service interface.

DETAILED DESCRIPTION OF THE INVENTION

Overview

Embodiments of the present invention overcome the aforementioned deficiencies of the known SOA methods like SOMA by specifying various categories of data elements needed to model services from available sources of inputs during the service specification phase when creating service components, especially in middleware based integration environments. Furthermore, embodiments of the present invention provide a method for categorizing data elements during the service specification phase. The various categories provided may include transaction elements, controller elements (i.e., context controller elements and filter elements), glue (a.k.a. bracing) elements (i.e., encapsulating elements and chromatic elements), extension patterns for promoting integration agility, implementation-specific extension elements that extend core (e.g., CIM) elements, and core standard (e.g., CIM) entities or middleware objects. Hereinafter, the aforementioned categories are also referred to as the data element categories. In one embodiment, the data element categories are non-overlapping (i.e., a data element may not belong to more than one data element category).

As used herein, an element (a.k.a. data element) is an object that contains an individual data item. The data element categories allow a middleware architect to design a robust service by systematically accounting for the data elements.

Data Element Categorization System

Figure 1:
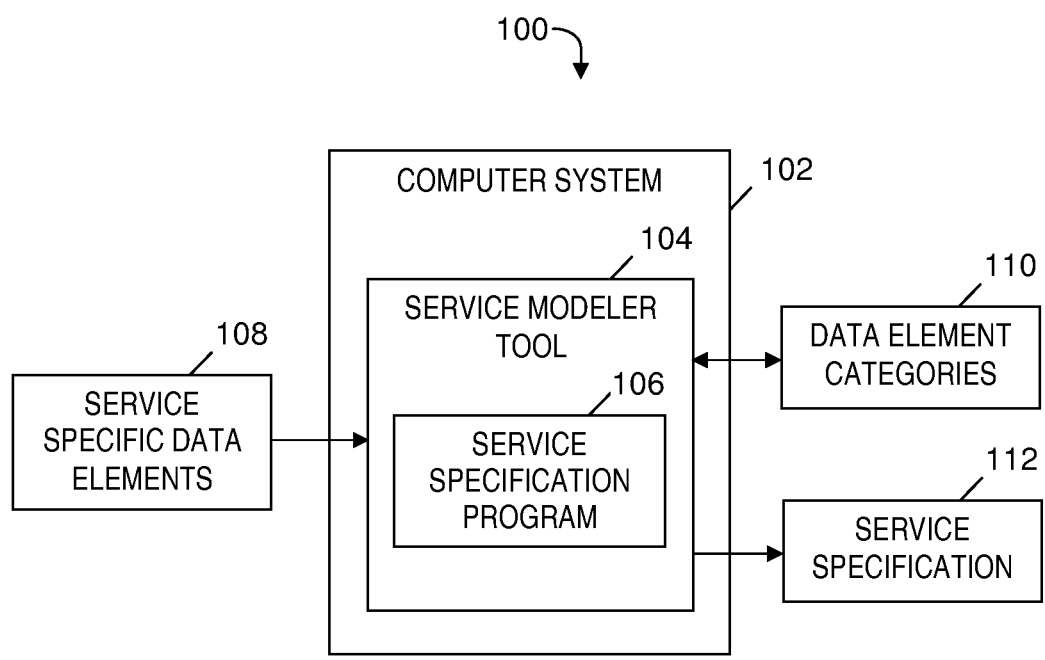
FIG. 1 is a block diagram of a system for categorizing data elements during an information definition of the service specification phase of the SOA life cycle as defined in a service modeling methodology such as SOMA, in accordance with embodiments of the present invention.

FIG. 1 is a block diagram of a system for categorizing data elements during an information definition of the service specification phase of the SOA life cycle as defined in a service modeling methodology such as SOMA, in accordance with embodiments of the present invention. System 100 includes a computer system 102, which includes a software based service modeler tool 104. Service modeler tool 104 includes a service specification computer program 106 (e.g., a plug-in auxiliary computer program). Service modeler tool 104 receives service specific data elements 108 as input to computer system 102, and provides the data elements 108 to service specification program 106. Further, service modeler tool 104 receives and stores data element categories 110 in a computer data storage unit (not shown). Service modeler tool 104 retrieves stored data element categories 110 and provides the categories to service specification program 106. Program 106 uses the retrieved data element categories 110 to categorize data elements 108 and generate a service specification 112 (e.g., a service interface). Service modeler tool 104 stores the generated service specification 112 in a computer data storage unit (not shown).

In one embodiment, service modeler tool 104 and service specification program 106 are implemented in a Unified Modeling Language (UML) based SOA or SOMA modeling software tool. For example, the service specification program 106 may be a middleware based integration plug-in for service specification residing in a SOMA 3.x operationalized tool being run by computer system 102. The SOMA 3.x tool is offered by International Business Machines Corporation located in Armonk, N.Y. The exemplary middleware based integration plug-in enables the service modeler 104 included in the SOMA 3.x tool to automatically account for the aforementioned categories of data elements in the service specification phase, thereby facilitating the design of a robust operation signature.

In one embodiment, the service specification program 106 provides a graphical user interface (GUI) that enables the input of the various data elements 108 in one or more of the data element categories 110 in a process described below relative to FIGS. 2A-2C. The program 106 allows SOA and SOMA practitioners to use a consistent, systematic approach to model services in application integration scenarios, thereby resulting in a robust service interface at minimal cost by employing nominally skilled resources.

Data Element Categorization Process

Figure 2A:
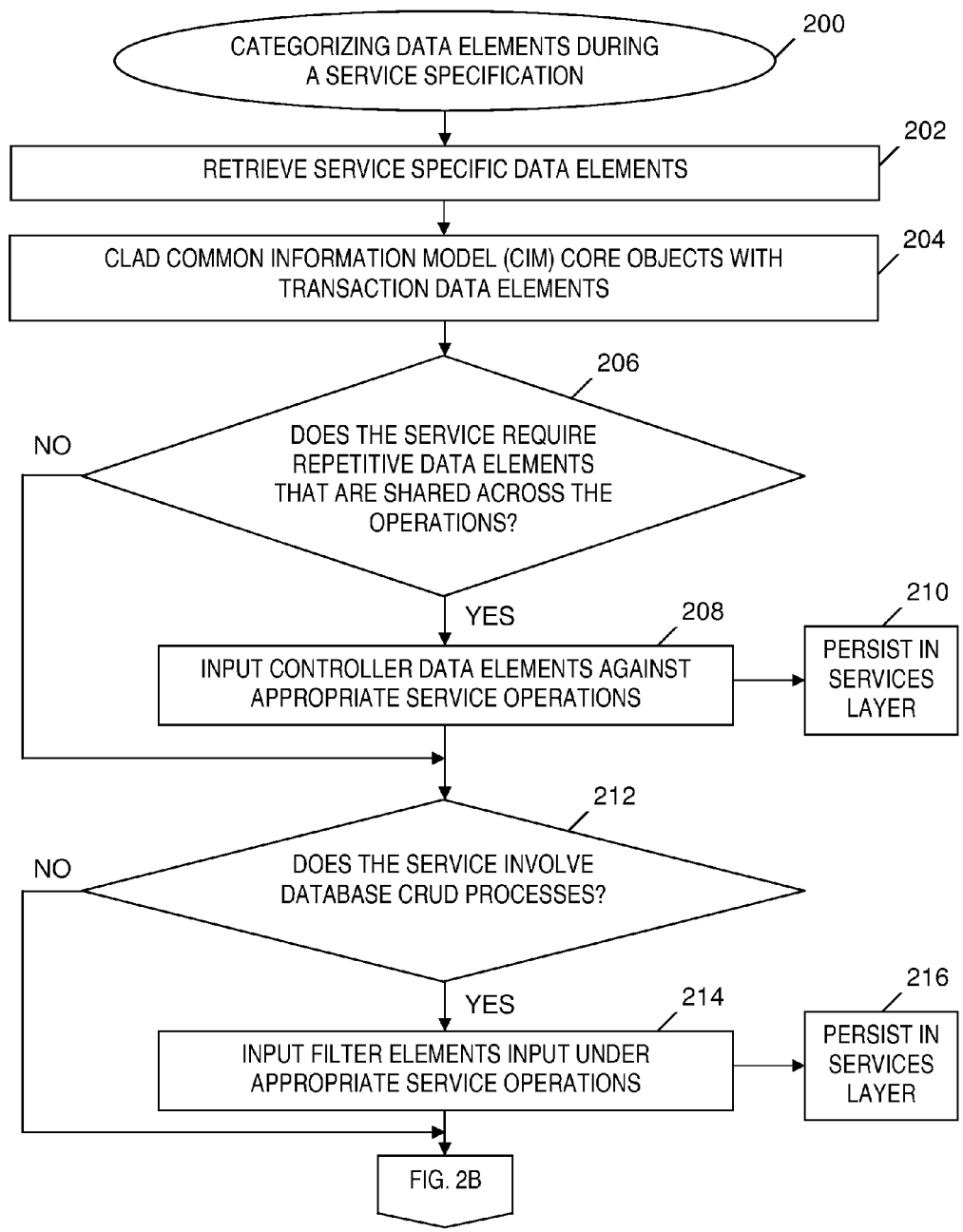
FIGS. 2A-2C depict a flowchart of a process for categorizing data elements during an information definition of the service specification phase of the SOA life cycle as defined in a service modeling methodology such as SOMA, where the process is implemented by the system of FIG. 1, in accordance with embodiments of the present invention.
Figure 2B:
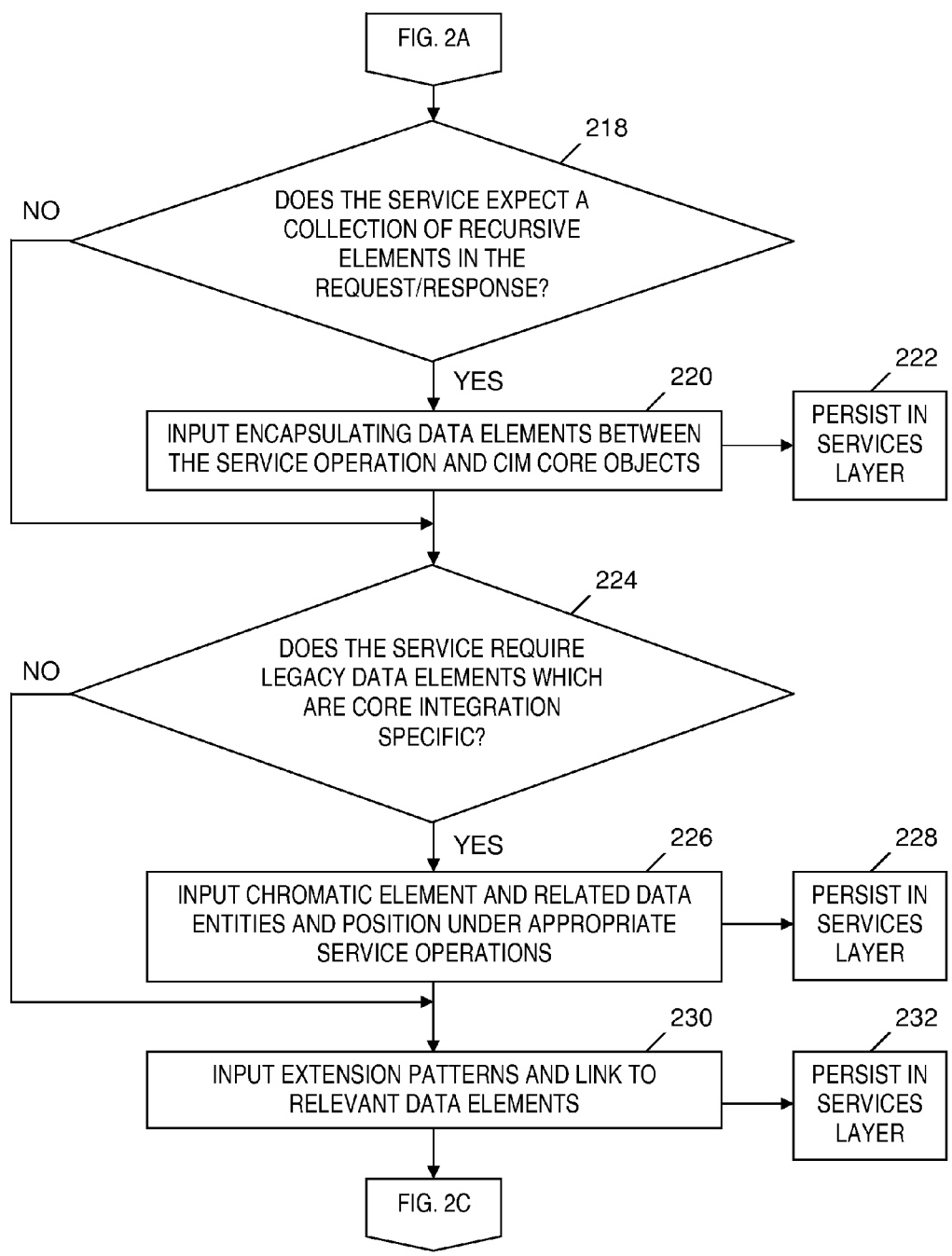
Figure 2C:
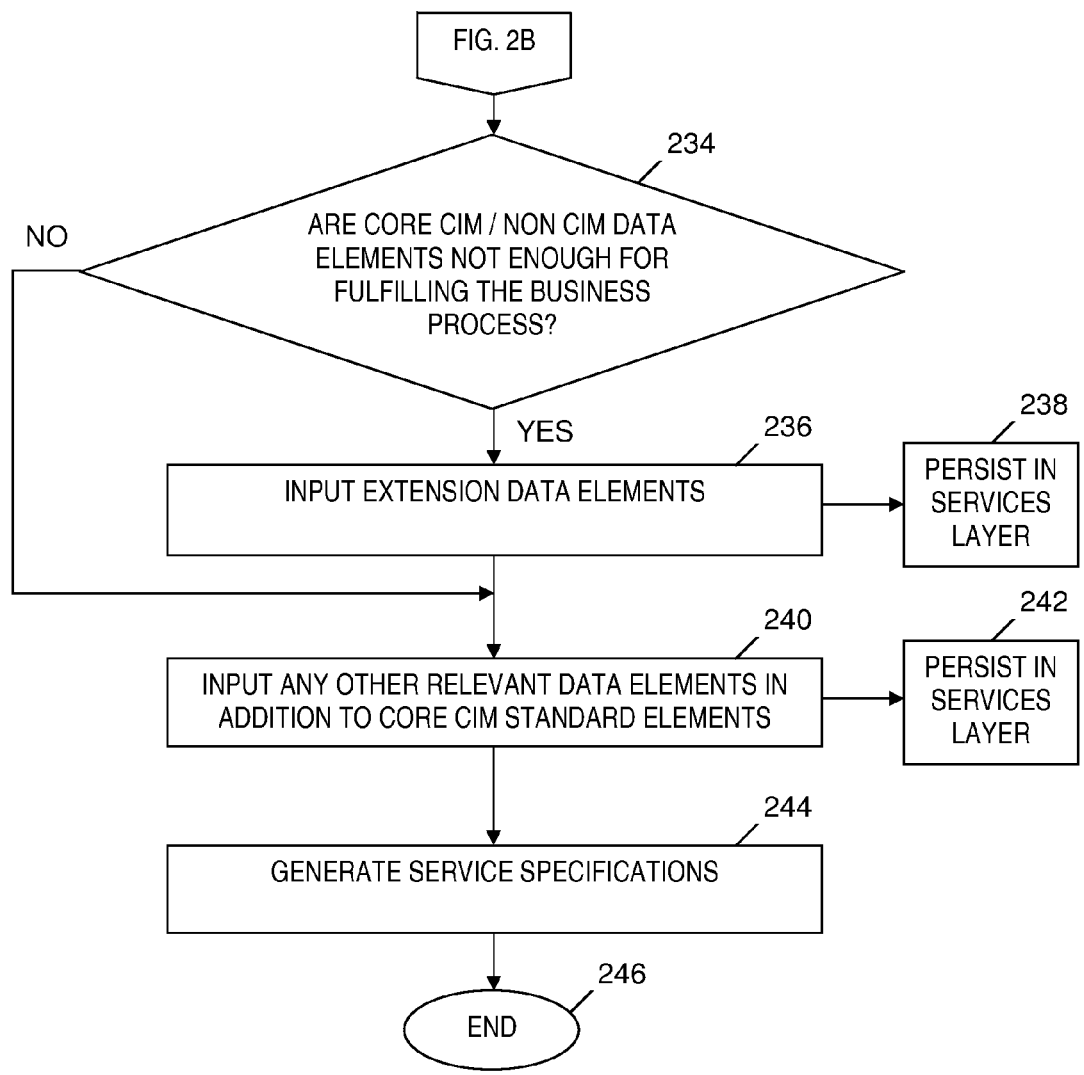

FIGS. 2A-2C depict a flowchart of a process for categorizing data elements during an information definition of the service specification phase of the SOA life cycle as defined in a service modeling methodology such as SOMA, where the process is implemented by the system of FIG. 1, in accordance with embodiments of the present invention. The process of categorizing data elements during the service specification phase starts at step 200. In step 202, service modeler tool 104 (see FIG. 1) retrieves service specific data elements 108 (see FIG. 1) from a computer data storage unit. For example, step 202 includes the service modeler tool retrieving the service specific data elements from a library, which also includes the CIM core layer.

In step 204, service specification program 106 (see FIG. 1) categorizes one or more service specific data elements 108 (see FIG. 1) as transaction data elements and clads (i.e., wraps) CIM core objects (i.e., CIM core elements) with the data elements categorized as transaction data elements. Transaction data elements include the details of a message. Further, transaction data elements are required for integrating software applications under conditions in which (1) a consumer of the service being modeled requires the provider of the service to send back the data level details in every response and/or (2) the consumer needs to be authenticated. The service interface being designed in the service specification phase needs to account for transaction data elements.

In one embodiment, service specification program 106 (see FIG. 1) provides a GUI that enables activating a transaction data element option that allows a user of computer system 102 (see FIG. 1) to select a message element, protocol element, system element, process element, and/or date element for a data element categorized as a transaction data element, along with a corresponding identifier (ID), corresponding name, and other corresponding attributes associated with each selected element. The message element includes the details of a message operation (a.k.a. service operation) (e.g., details of a request or a response). The protocol element specifies the protocol utilized in sending the message. The system element includes the system that is sending the message. The process element specifies the process that initiates the message and may include a process identifier. The date element includes the date the message is sent. Depending on the requirements of the service being modeled, the designer has an option to introduce a container object to hold the selected element(s). In one embodiment, the GUI provided by service specification program 106 (see FIG. 1) allows a user of computer system 102 (see FIG. 1) to indicate an association between the selected element(s) and a message operation (e.g., a request or a response) of the service being modeled (e.g., by dragging and dropping the selected element(s) under the message operation in a UML diagram). The service specification program receives and stores the association between the selected element(s) of the transaction data element and the message operation of the service.

In step 204 and subsequent steps of FIGS. 2A-2C that associate data elements with corresponding message operations, if a first service operation that is associated with a data element is a request, then a second service operation that is a response to that request is also associated with the data element. Both the request and its response are defined under a complex operation element, which is specified under a service.

In one embodiment, the service specification program 106 (see FIG. 1) receives input core CIM elements and an association of core CIM elements and corresponding relevant message operations of the service being modeled. The GUI provided by the service specification program may allow a user of the computer system 102 (see FIG. 1) to indicate the association of core CIM elements and corresponding message operations.

In inquiry step 206, service specification program 106 (see FIG. 1) determines whether or not the service being modeled requires repetitive (i.e. repeating) data elements that are shared across operations of the service. If step 206 determines that the service requires repetitive data elements, then the Yes branch of step 206 is taken and step 208 is performed. Known design strategy dictates a single operation if the number of repeating data elements is, for example, greater than 90% of all data elements.

In step 208, service specification program 106 (see FIG. 1) receives input of one or more service specific data elements 108 (see FIG. 1) and categorizes the input as controller data elements. Also in step 208, the service specification program 106 (see FIG. 1) receives an association between each controller data element and a corresponding operation of the service being modeled. An operation of the service being modeled is also referred to herein as a service operation. In one embodiment, the GUI provided by service specification program 106 (see FIG. 1) allows a user of computer system 102 (see FIG. 1) to specify the association between each controller data element and the corresponding service operation. Controller data elements categorized in step 208 may include context controller elements that are required to drive the operation context (i.e., drive the behavior of the operations within the service being modeled) and reside below their associated message operations in a UML representation of the service being modeled. For example, for a service that manages purchase orders, a controller element (e.g., a request flag) under a single service operation drives the behavior of service interface data to create, modify, or delete a purchase order, instead of having three different operations (i.e., a create operation, a modify operation, and a delete operation) under the service.

In step 210, the service specification program 106 (see FIG. 1) persists in the services layer the categorization of the data element(s) as controller data elements and the aforementioned association between the controller data elements and the corresponding service operations. In one embodiment, in step 210, the service specification program 106 (see FIG. 1) stores the categorization performed and association received in step 208 in a computer data storage unit (e.g., storage unit 812 in FIG. 8).

Inquiry step 212 is performed after step 208 or after taking the No branch of step 206 (i.e., step 206 determines that the service does not require repetitive data elements that are shared across the operations of the service).

In inquiry step 212, service specification program 106 (see FIG. 1) determines whether or not the service being modeled involves (i.e., utilizes) operations that perform any database CRUD processes (i.e., processes that create, read, update or delete data). If step 212 determines that the service utilizes an operation that performs a database CRUD process, then the Yes branch of step 212 is taken and step 214 is performed.

In step 214, service specification program 106 (see FIG. 1) receives input of one or more service specific data elements 108 (see FIG. 1) and categorizes the input as filter elements. A filter element is another type of controller data element. Also in step 214, the service specification program 106 (see FIG. 1) receives an association between each filter element and a corresponding service operation. In one embodiment, the GUI provided by service specification program 106 (see FIG. 1) allows a user of computer system 102 (see FIG. 1) to specify the association between each filter element and the corresponding service operation (e.g., by placing each filter element below its corresponding operation of the service in a UML representation of the service). Filter elements are normally required to filter results of database queries managed by the service being modeled.

In step 216, the service specification program 106 (see FIG. 1) persists in the services layer the categorization of the one or more service specific data elements as filter elements and the association between the filter elements and the corresponding service operations. In one embodiment, in step 216, the service specification program 106 (see FIG. 1) stores the categorization performed and the association received in step 214 in a computer data storage unit (e.g., storage unit 812 in FIG. 8).

The process of FIGS. 2A-2C continues with inquiry step 218 in FIG. 2B, which is performed after step 214 or after taking the No branch of step 212 (i.e., step 212 determines that the service does not involve database CRUD processes).

In inquiry step 218, service specification program 106 (see FIG. 1) determines whether or not the service being modeled expects a collection of recursive elements in a request or response operation of the service. If step 218 determines that the service expects a collection of recursive elements in the request or response, then the Yes branch of step 218 is taken and step 220 is performed.

In step 220, service specification program 106 (see FIG. 1) receives input of one or more encapsulating data elements (a.k.a. encapsulating elements) between request and/or response operation(s) of the service and CIM core object(s). An encapsulating data element is a type of glue element, which resides between a message operation of a service and a middleware element and serves as a clamp therebetween. In one embodiment, the GUI provided by service specification program 106 (see FIG. 1) allows a user of computer system 102 (see FIG. 1) to input the aforementioned encapsulating data elements, specify the aforementioned service operation(s) and CIM core object(s), and associate the encapsulating data elements with corresponding message operations of the service being modeled.

When the service response is a collection of objects or the service request is requesting a collection of objects, an encapsulating data element is required. For example, when a service termed as ServiceInventoryManagement has an operation RetrieveServiceDetails with input AddressIdentifier, the result may have multiple instances of Services. The encapsulating data element enables easy handling of the collection of returned objects in between the message operation of the service being modeled and the objects.

In step 222, the service specification program 106 (see FIG. 1) persists the aforementioned encapsulating data element(s) in the services layer. In one embodiment, in step 222, the service specification program 106 (see FIG. 1) stores the encapsulating data element(s) received in step 220 in a computer data storage unit (e.g., storage unit 812 in FIG. 8).

Inquiry step 224 is performed after step 220 or after taking the No branch of step 218 (i.e., step 218 determines that the service does not expect a collection of recursive elements in any request or response operation of the service).

In inquiry step 224, service specification program 106 (see FIG. 1) determines whether or not the service being modeled requires legacy data elements that are core integration specific. If step 224 determines that the service requires the aforementioned legacy data elements, then the Yes branch of step 224 is taken and step 226 is performed.

In step 226, service specification program 106 (see FIG. 1) receives input of one or more service specific data elements 108 (see FIG. 1) and categorizes the input as chromatic elements. Also in step 226, the service specification program 106 (see FIG. 1) receives input of data entities related to each chromatic element, along with an association between each chromatic element and a corresponding service operation. In one embodiment, the GUI provided by service specification program 106 (see FIG. 1) allows a user of computer system 102 (see FIG. 1) to specify the association between each chromatic element and the corresponding service operation (e.g., by placing each chromatic element below its corresponding service operation in a UML representation of the service).

A chromatic element is a type of a glue element. Again, a glue element resides between a message operation of a service and a middleware element and serves as a clamp therebetween. Business needs may require that the service expose legacy specific attributes. Such legacy specific attributes are categorized as chromatic elements and need to be contained in a legacy container so that they are not manifest loosely in the service interface. A chromatic element may be specified by, for example, Format, TaskSourceId, VersionString, DateTimeFieldName, etc.

In step 228, the service specification program 106 (see FIG. 1) persists the categorization of the one or more service specific data elements as chromatic elements in the services layer. In one embodiment, in step 228, the service specification program 106 (see FIG. 1) stores the categorization performed and the association received in step 226 in a computer data storage unit (e.g., storage unit 812 in FIG. 8).

Step 230 is performed following step 226 or following taking the No branch of step 224 (i.e., step 224 determines that the service does not require legacy data elements that are core integration specific).

In step 230, service specification program 106 (see FIG. 1) receives input of one or more extension patterns for related elements and an association (i.e., a link) between the received extension pattern(s) and corresponding relevant data elements of the service being modeled. In one embodiment, the GUI provided by service specification program 106 (see FIG. 1) allows a user of computer system 102 (see FIG. 1) to specify the association between each extension pattern and the corresponding data element of the service being modeled.

A category of extension pattern is an element that promotes re-use and business and integration agility. In order for a service contract to be generic and flexible enough to absorb future needs, there is a need to introduce specific extension patterns in every service. In one embodiment, each extension pattern is realized as a collection of data elements. In one embodiment, each extension pattern may be one of the following example patterns:

Name-Value Pattern:

This pattern (a.k.a. characteristic pattern) is generic enough to accommodate any incoming attribute of a data element that is characterized by a name and a value associated with the name. Further processing that absorbs new elements having this name value pattern is the responsibility of the implementation layer and does not affect the interface. A text pattern (i.e., comma separated values) may absorb any arbitrary value.

Type Pattern:

This pattern accommodates multiple numbers of the same objects in different contexts. For example, in a service for address management, having a type pattern element in an Address structure at the topmost parent element enables accommodating multiple types of addresses from different consumers of the service being modeled.

Multi Level Multi Type Pattern:

This pattern and the relevant data elements linked thereto (see step 230) are used to accommodate objects, each object having multiple types of relationships with other elements. Each service instance having a multi level multi type pattern may have offspring in a nested structure and each instance may have multiple other types of association to other instances (e.g., Associate, Offspring, Parent and Seized).

In step 232, the service specification program 106 (see FIG. 1) persists the received extension pattern(s) and link(s) to relevant data elements. In one embodiment, in step 232, the service specification program 106 (see FIG. 1) stores the extension pattern(s) and link(s) to relevant data elements received in step 230 in a computer data storage unit (e.g., storage unit 812 in FIG. 8).

After step 230, the process of FIGS. 2A-2C continues with step 234 in FIG. 2C. In inquiry step 234, service specification program 106 (see FIG. 1) determines whether the core CIM or non-CIM data elements are insufficient for fulfilling the business process to be achieved by the service being modeled. If step 230 determines that the core CIM or non-CIM data elements are not enough for fulfilling the aforementioned business process, then the Yes branch of step 234 is taken and step 236 is performed.

In step 236, service specification program 106 (see FIG. 1) receives input of one or more service specific data elements 108 (see FIG. 1) and categorizes the input as implementation-specific extension data elements. In one embodiment, the GUI provided by service specification program 106 (see FIG. 1) allows a user of computer system 102 (see FIG. 1) to specify the data elements to be categorized as extension data elements.

In one embodiment, an extension data element is an extension of a CIM element. In middleware projects where standards based CIM is positioned, there is a requirement to extend the CIM elements for catering to implementation. The service specification program 106 (see FIG. 1) enables the modeler to extend the CIM elements and position the extensions of the CIM elements in corresponding relevant operations of the service being modeled. The extension data elements may be for adding additional objects, adding additional attributes, adding a collection of elements together with relationships, etc.

In step 238, the service specification program 106 (see FIG. 1) persists the categorization of the one or more service specific data elements as extension data elements in the services layer. In one embodiment, in step 238, the service specification program 106 (see FIG. 1) stores the categorization performed in step 236 in a computer data storage unit (e.g., storage unit 812 in FIG. 8).

Step 240 is performed after step 236 or following taking the No branch of step 234 (i.e., step 234 determines that the core CIM elements and non CIM data elements are sufficient for fulfilling the aforementioned business process).

In step 240, the service specification program 106 (see FIG. 1) optionally receives and categorizes input of one or more other relevant data elements in addition to core CIM standard elements. If data element(s) are received in step 240, then in step 242, the service specification program 106 (see FIG. 1) persists the input received and the categorization performed in step 240 in the services layer. In one embodiment, in step 242, the service specification program 106 (see FIG. 1) stores the categorization performed in step 240 in a computer data storage unit (e.g., storage unit 812 in FIG. 8).

In step 244 (following step 240), the service specification program 106 (see FIG. 1) generates the service specification, which is the output of the service specification phase. Based upon the result of step 244, subsequent service modeling and steps thereof can be performed, which is beyond the scope of this invention. Generating the service specification in step 244 may include generating a service interface required by the service being modeled. The process of FIGS. 2A-2C ends at step 246.

In one embodiment, each of the aforementioned associations indicated between the data elements and corresponding service operations in the process of FIGS. 2A-2C include an indication of the type of relationship (e.g., one-to-one relationship) between the data element and the associated service operation.

In one embodiment, the process of FIGS. 2A-2C is modified to include inputs of data elements to only a proper subset of the following set of categories: transaction elements, controller elements, glue elements, extension patterns for business agility, extension elements and core CIM elements. For example, the process of FIGS. 2A-2C may be modified to include inputs of data elements to transaction elements, glue elements, extension elements, core CIM elements, optionally to controller elements, and optionally to extension patterns for business agility (i.e., the process of FIGS. 2A-2C may be changed to make the following steps optional: steps 206, 208, 210, 212, 214, and 216 in FIG. 2A and steps 230 and 232 in FIG. 2B that address controller data elements, filter elements and extension patterns)

Data Element Category Examples

Figure 3:
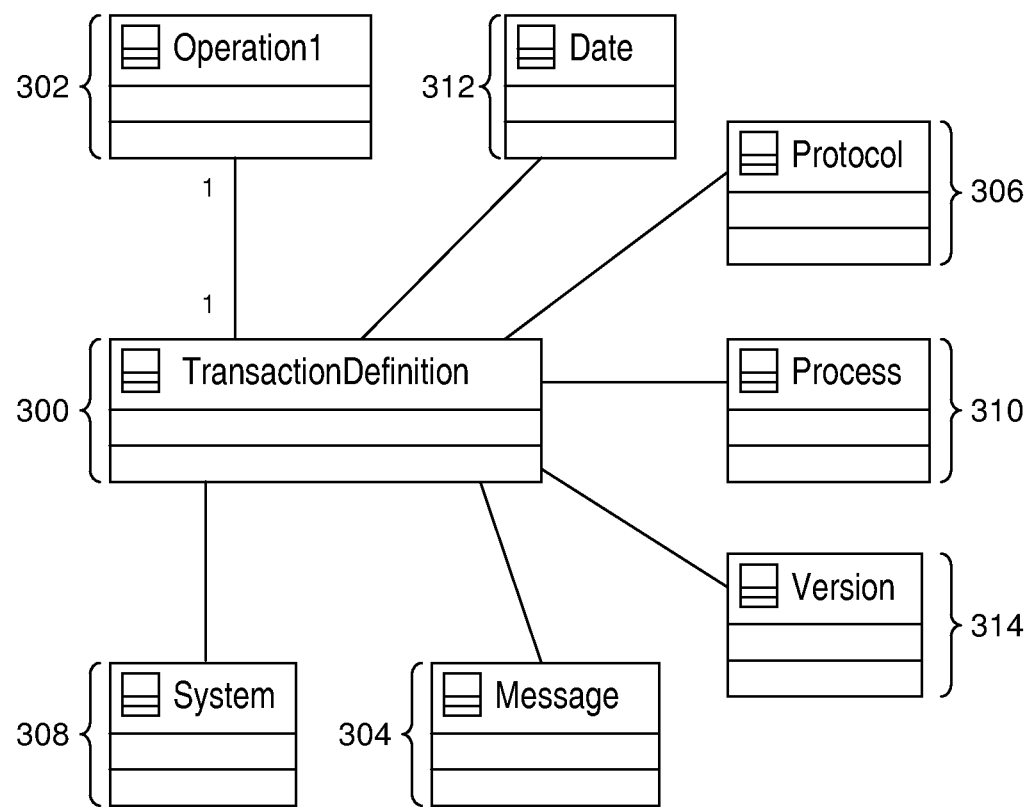
FIG. 3 depicts a sample specification of a transaction element that categorizes data elements in the process of FIGS. 2A-2C, in accordance with embodiments of the present invention.

FIG. 3 depicts a sample specification of a transaction element that categorizes data elements in the process of FIGS. 2A-2C, in accordance with embodiments of the present invention. TransactionDefinition 300 indicates an example of a definition of a transaction element that is in one-to-one correspondence with Operation) 302. Operation) 302 a corresponding operation (e.g., a request) of a service being modeled. Elements of the definition of the transaction element include Message 304, Protocol 306, System 308, Process 310, Date 312 and Version 314. The definition of the transaction element in FIG. 3 is an example of a result of step 204 (see FIG. 2A) that indicates an association between selected elements (i.e., elements 304, 306, 308, 310, 312 and 314) of a definition of a transaction element (i.e., TransactionDefinition 300) and a message operation (i.e., Operation) 302). TransactionDefinition 300 is an example of a result of step 204 in FIG. 2A.

Figure 4:
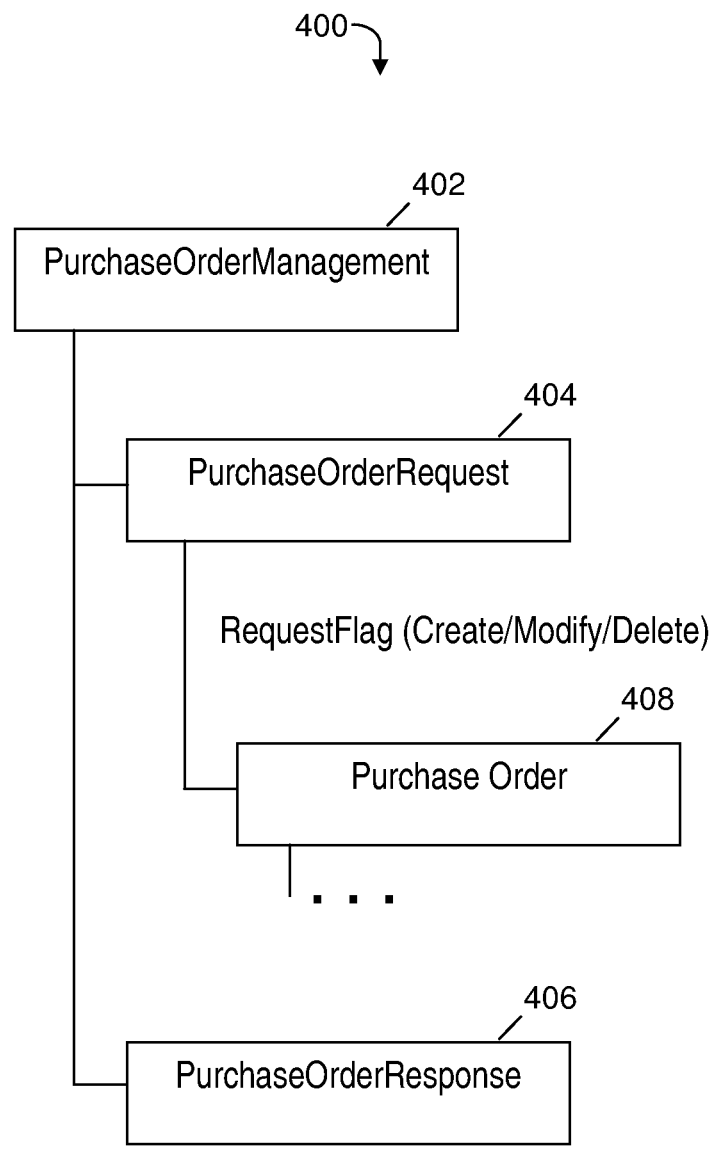
FIG. 4 depicts an example of a context controller element that categorizes data elements in the process of FIGS. 2A-2C, in accordance with embodiments of the present invention.

FIG. 4 depicts an example of a context controller element that categorizes data elements in the process of FIGS. 2A-2C, in accordance with embodiments of the present invention. Example 400 includes PurchaseOrderManagement 402 (i.e., a service being modeled that manages purchase orders), a PurchaseOrderRequest 404 (i.e., a request operation of the service being modeled), and a PurchaseOrderResponse 406 (i.e., a response operation of the service being modeled). A context controller element RequestFlag (Create/Modify/Delete) depicted below the PurchaseOrderRequest 404 in FIG. 4 is a value that defines the request operation by indicating either a request to create a Purchase Order 408, modify Purchase Order 408 or delete Purchase Order 408. As Purchase Order 408 is depicted under PurchaseOrderRequest 404, Purchase Order 408 is a result of the request 404. Further, Purchase Order 408 may be an XSD element specified as a complex type, and may include multiple attributes of a purchase order, such as a purchase order identifier (not shown) and a product code (not shown). XSD refers to an XML Schema Document, where XML is Extensible Markup Language. Other XSD elements (not shown) may be associated with PurchaseOrderRequest 404. Example 400 may be a result of step 208 in FIG. 2A.

Figure 5:
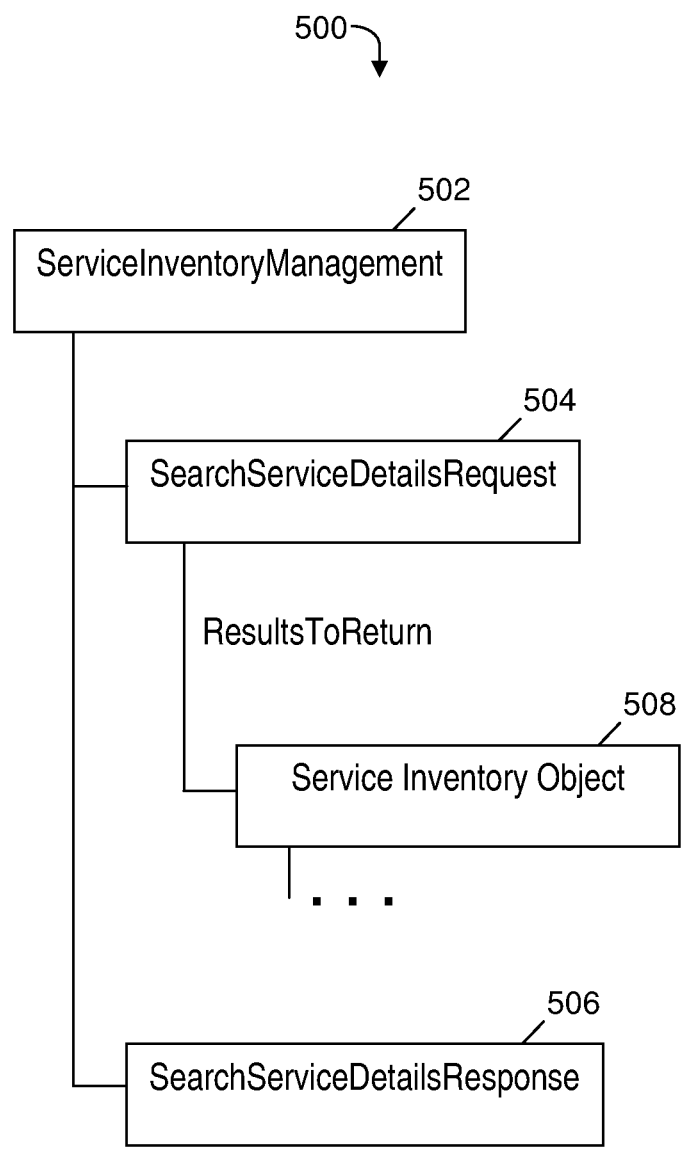
FIG. 5 depicts an example of a filter element that categorizes data elements in the process of FIGS. 2A-2C, in accordance with embodiments of the present invention.

FIG. 5 depicts an example of a filter element that categorizes data elements in the process of FIGS. 2A-2C, in accordance with embodiments of the present invention. Example 500 includes ServiceInventoryManagement 502 (i.e., a service being modeled that manages inventory), a SearchServiceDetailsRequest 504 (i.e., a request operation of the service being modeled), and a SearchServiceDetailsResponse 506 (i.e., a response operation of the service being modeled). A filter element ResultsToReturn depicted below SearchServiceDetailsRequest 504 in FIG. 5 is a type of controller element that filters the results of database queries initiated by SearchServiceDetailsRequest 504. A result of a database query initiated by request 504 is a Service Inventory Object 508. Other objects (not shown) may also be results of request 504. Example 500 may be a result of step 214 in FIG. 2A.

Figure 6:
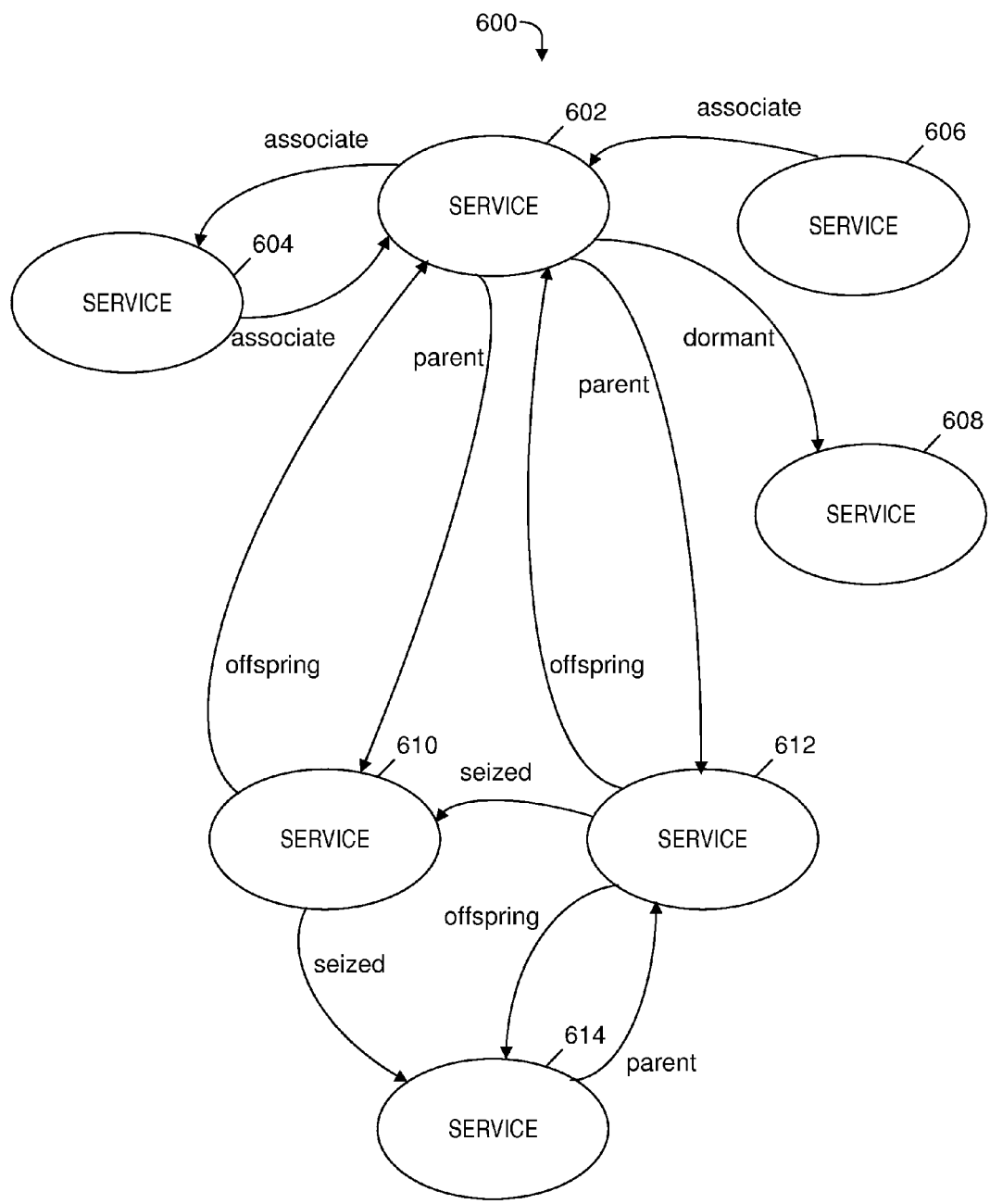
FIG. 6 depicts an example of an extension pattern that categorizes data elements in the process of FIGS. 2A-2C and that promotes integration agility, in accordance with embodiments of the present invention.

FIG. 6 depicts an example of an extension pattern that categorizes data elements in the process of FIGS. 2A-2C and that promotes integration agility, in accordance with embodiments of the present invention. Example 600 exemplifies the multi level multi type pattern discussed above relative to step 230 in FIG. 2B. Example 600 includes multiple instances of a service (i.e., service instances 602, 604, 606, 608, 610, 612 and 614), where some instances of the service are related to other instances of the service by multiple types of association (e.g., Associate, Parent, Offspring, Seized) with multiple levels. For instance, service instance 602 is an Associate of service instance 604, a Parent of service instance 610, and parent of service instance 612. The offspring of a service instance in a multi level multi type pattern may also be related to other service instances by multiple types of association. For instance, service instance 612 (i.e., an offspring of service instance 602) is in a Seized relationship to service instance 610 and is an Offspring of service instance 614. Example 600 may be a result of step 230 in FIG. 2B.

Figure 7:
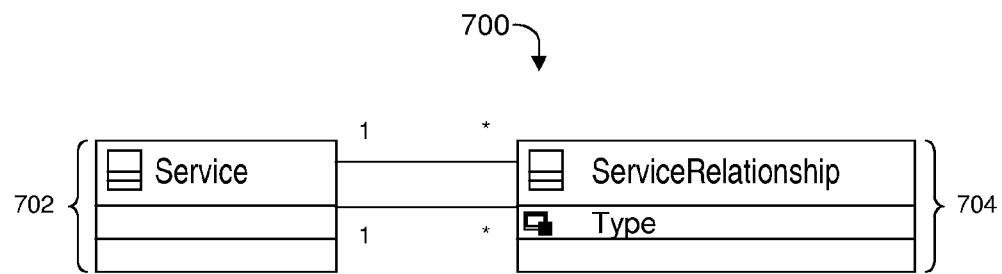
FIG. 7 depicts a specification of a service component that accommodates the relationships included in the extension pattern in FIG. 6, in accordance with embodiments of the present invention.

FIG. 7 depicts a specification of a service component that accommodates the relationships included in the extension pattern in FIG. 6, in accordance with embodiments of the present invention. Specification 700 accommodates the complex relationships of the multi level multi type pattern shown in FIG. 6. Specification 700 specifies Service 702 as being in a one-to-many relationship with ServiceRelationship 704. Via the Type attribute in ServiceRelationship 704, the service specification program 106 (see FIG. 1) provides capability to accommodate the relationships depicted in FIG. 6 (e.g., Type=Associate, Offspring, Parent, Seized) and is easily extended to accommodate any other type of relationship needed in the future, thereby accounting for the complex structure of FIG. 6.

Computer System

Figure 8:
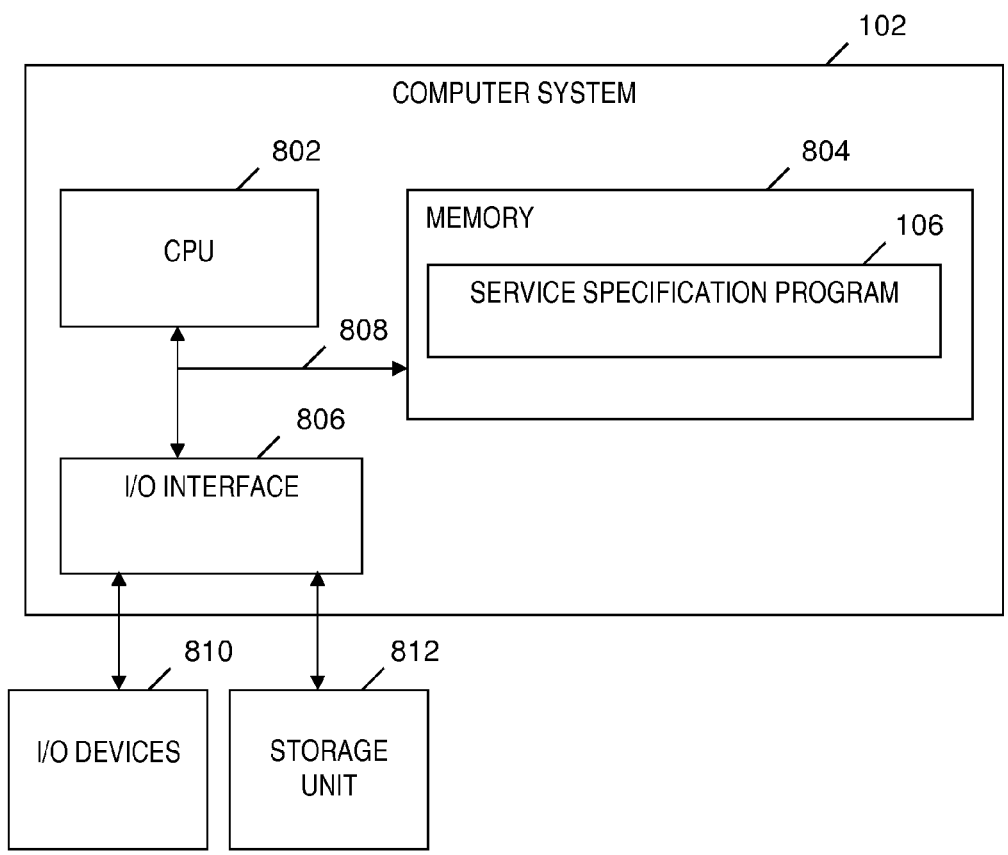
FIG. 8 is a block diagram of a computer system that is included in the system of FIG. 1 and that implements the process of FIGS. 2A-2C, in accordance with embodiments of the present invention.

FIG. 8 is a block diagram of a computer system that is included in the system of FIG. 1 and that implements the process of FIGS. 2A-2C, in accordance with embodiments of the present invention. Computer system 102 generally comprises a central processing unit (CPU) 802, a memory 804, an I/O interface 806, and a bus 808. Further, computer system 102 is coupled to I/O devices 810 and a computer data storage unit 812. CPU 802 performs computation and control functions of computer system 102. CPU 802 may comprise a single processing unit, or be distributed across one or more processing units in one or more locations (e.g., on a client and server).

Memory 804 may comprise any known computer readable storage medium, which is described below. In one embodiment, cache memory elements of memory 804 provide temporary storage of at least some program code (e.g., program code 106) in order to reduce the number of times code must be retrieved from bulk storage while instructions of the program code are carried out. Moreover, similar to CPU 802, memory 804 may reside at a single physical location, comprising one or more types of data storage, or be distributed across a plurality of physical systems in various forms. Further, memory 804 can include data distributed across, for example, a local area network (LAN) or a wide area network (WAN).

I/O interface 806 comprises any system for exchanging information to or from an external source. I/O devices 810 comprise any known type of external device, including a display device (e.g., monitor), keyboard, mouse, printer, speakers, handheld device, facsimile, etc. Bus 808 provides a communication link between each of the components in computer system 102, and may comprise any type of transmission link, including electrical, optical, wireless, etc.

I/O interface 806 also allows computer system 102 to store and retrieve information (e.g., data or program instructions such as program code 106) from an auxiliary storage device such as computer data storage unit 812 or another computer data storage unit (not shown). Computer data storage unit 812 may comprise any known computer readable storage medium, which is described below. For example, computer data storage unit 812 may be a non-volatile data storage device, such as a magnetic disk drive (i.e., hard disk drive) or an optical disc drive (e.g., a CD-ROM drive which receives a CD-ROM disk).

Memory 804 may store computer program code 106 that provides the logic for categorizing data elements during the service specification phase, which is included in the process in FIGS. 2A-2C. In one embodiment, program code 106 is included in service modeler tool 104 (see FIG. 1). Further, memory 804 may include other systems not shown in FIG. 8, such as an operating system (e.g., Linux) that runs on CPU 802 and provides control of various components within and/or connected to computer system 102.

Storage unit 812 and/or one or more other computer data storage units (not shown) that are coupled to computer system 102 may store service specific data elements 108 (see FIG. 1), data element categories 110 (see FIG. 1), and/or the service specification 112 (e.g., service interface) generated as a result of the process in FIGS. 2A-2C.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 102). Furthermore, an embodiment of the present invention may take the form of a computer program product embodied in one or more computer readable medium(s) (e.g., memory 804 or computer data storage unit 812) having computer readable program code (e.g., program code 106) embodied or stored thereon.

Any combination of one or more computer readable medium(s) (e.g., memory 804 and computer data storage unit 812) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 106) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 106) embodied on a computer readable medium may be transmitted using any appropriate medium, including but not limited to wireless, wireline, optical fiber cable, RF, etc., or any suitable combination of the foregoing.

Computer program code (e.g., program code 106) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2C) and/or block diagrams of methods, apparatus (systems) (e.g., FIG.

1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 106). These computer program instructions may be provided to a processor (e.g., CPU 802) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 804 or computer data storage unit 812) that can direct a computer (e.g., computer system 102), other programmable data processing apparatus, or other devices to function in a particular manner, such that the instructions (e.g., program 106) stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 106) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of categorizing data elements during the service specification phase. Thus, an embodiment of the present invention discloses a process for supporting computer infrastructure, comprising integrating, hosting, maintaining and deploying computer-readable code (e.g., program code 106) into a computer system (e.g., computer system 102), wherein the code in combination with the computer system is capable of performing a process of categorizing data elements during the service specification phase.

In another embodiment, the invention provides a business method that performs the process steps of the invention on a subscription, advertising and/or fee basis. That is, a service provider, such as a Solution Integrator, can offer to create, maintain, support, etc. a process of categorizing data elements during the service specification phase. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2C and the block diagrams in FIG. 1 and FIG. 8 illustrate the architecture, functionality, and operation of possible implementations of systems, methods, and computer program products according to various embodiments of the present invention. In this regard, each block in the flowchart or block diagrams may represent a module, segment, or portion of code (e.g., program code 106), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of specifying categories of data elements during a service specification phase of a service-oriented architecture (SOA) life cycle defined in a service modeling methodology, the method comprising the step of:
   during the service specification phase of the SOA life cycle defined in the service modeling methodology, a computer system specifying first, second, third and fourth sets of one or more data elements included in a plurality of data elements specific to a service as being in a first, second, third and fourth categories, respectively, wherein the first category specifies transaction elements that provide information required to be sent in a response to a request for the service and that are required for integrating applications, wherein the second category specifies glue elements that associate an operation of the service to middleware elements, wherein the third category specifies core Common Information Model (CIM) elements, and wherein the fourth category specifies extension elements that extend the core CIM elements.

2. The method of claim 1, further comprising the step of:
   during the service specification phase of the SOA life cycle, the computer system generating one or more service specifications of the service based on the first, second, third and fourth sets of one or more data elements being in the first, second, third, and fourth categories, respectively.

3. The method of claim 1, further comprising the step of:
   the computer system specifying a fifth set of one or more data elements as being in a fifth category, wherein the fifth category specifies controller elements that include elements selected from the group consisting of context controller elements that control a context of the operation of the service, filter elements that filter data retrieved based on a query of a database, and a combination thereof, and wherein the first, second, third, fourth, and fifth sets of one or more data elements are mutually exclusive.

4. The method of claim 3, further comprising the step of:
   during the service specification phase of the SOA life cycle, the computer system generating one or more service specifications of the service based on the first, second, third, fourth and fifth sets of one or more data elements being in the first, second, third, fourth, and fifth categories, respectively.

5. The method of claim 1, further comprising the step of:
the computer system specifying a fifth set of one or more data elements as being in a fifth category, wherein the fifth category specifies extension pattern elements that include patterns selected from the group consisting of: a name-value pattern, a type pattern, a multi level multi type pattern, and combinations thereof, and wherein the first, second, third, fourth, and fifth sets of one or more data elements are mutually exclusive.

6. The method of claim 5, further comprising the step of:
during the service specification phase of the SOA life cycle, the computer system generating one or more service specifications of the service based on the first, second, third, fourth and fifth sets of one or more data elements being in the first, second, third, fourth, and fifth categories, respectively.

7. A computer system comprising:
a central processing unit (CPU);
a memory coupled to the CPU; and
a computer-readable, tangible storage device coupled to the CPU, the storage device containing instructions that when carried out by the CPU implement a method of specifying categories of data elements during a service specification phase of a service-oriented architecture (SOA) life cycle defined in a service modeling methodology, the method comprising the step of:
during the service specification phase of the SOA life cycle defined in the service modeling methodology, the computer system specifying first, second, third and fourth sets of one or more data elements included in a plurality of data elements specific to a service as being in a first, second, third and fourth categories, respectively, wherein the first category specifies transaction elements that provide information required to be sent in a response to a request for the service and that are required for integrating applications, wherein the second category specifies glue elements that associate an operation of the service to middleware elements, wherein the third category specifies core Common Information Model (CIM) elements, and wherein the fourth category specifies extension elements that extend the core CIM elements.

8. The computer system of claim 7, wherein the method further comprises the step of:
during the service specification phase of the SOA life cycle, the computer system generating one or more service specifications of the service based on the first, second, third and fourth sets of one or more data elements being in the first, second, third, and fourth categories, respectively.

9. The computer system of claim 7, wherein the method further comprises the step of:
the computer system specifying a fifth set of one or more data elements as being in a fifth category, wherein the fifth category specifies controller elements that include elements selected from the group consisting of context controller elements that control a context of the operation of the service, filter elements that filter data retrieved based on a query of a database, and a combination thereof, and wherein the first, second, third, fourth, and fifth sets of one or more data elements are mutually exclusive.

10. The computer system of claim 9, wherein the method further comprises the step of:
during the service specification phase of the SOA life cycle, the computer system generating one or more service specifications of the service based on the first, second, third, fourth and fifth sets of one or more data elements being in the first, second, third, fourth, and fifth categories, respectively.

11. The computer system of claim 7, wherein the method further comprises the step of:
the computer system specifying a fifth set of one or more data elements as being in a fifth category, wherein the fifth category specifies extension pattern elements that include patterns selected from the group consisting of: a name-value pattern, a type pattern, a multi level multi type pattern, and combinations thereof, and wherein the first, second, third, fourth, and fifth sets of one or more data elements are mutually exclusive.

12. The computer system of claim 11, wherein the method further comprises the step of:
during the service specification phase of the SOA life cycle, the computer system generating one or more service specifications of the service based on the first, second, third, fourth and fifth sets of one or more data elements being in the first, second, third, fourth, and fifth categories, respectively.

13. A computer program product, comprising:
a computer-readable, tangible storage device that is not a transitory form of signal transmission; and
a computer-readable program code containing instructions that, when carried out by a processor of a computer system, implement a method of specifying categories of data elements during a service specification phase of a service-oriented architecture (SOA) life cycle defined in a service modeling methodology, the method comprising the steps of:
during the service specification phase of the SOA life cycle defined in the service modeling methodology, the computer system specifying first, second, third and fourth sets of one or more data elements included in a plurality of data elements specific to a service as being in a first, second, third and fourth categories, respectively, wherein the first category specifies transaction elements that provide information required to be sent in a response to a request for the service and that are required for integrating applications, wherein the second category specifies glue elements that associate an operation of the service to middleware elements, wherein the third category specifies core Common Information Model (CIM) elements, and wherein the fourth category specifies extension elements that extend the core CIM elements.

14. The program product of claim 13, wherein the method further comprises the step of:
during the service specification phase of the SOA life cycle, the computer system generating one or more service specifications of the service based on the first, second, third and fourth sets of one or more data elements being in the first, second, third, and fourth categories, respectively.

15. The program product of claim 13, wherein the method further comprises the step of:
the computer system specifying a fifth set of one or more data elements as being in a fifth category, wherein the fifth category specifies controller elements that include elements selected from the group consisting of context controller elements that control a context of the operation of the service, filter elements that filter data retrieved based on a query of a database, and a combination thereof, and wherein the first, second, third, fourth, and fifth sets of one or more data elements are mutually exclusive.

16. The program product of claim 15, wherein the method further comprises the step of:

during the service specification phase of the SOA life cycle, the computer system generating one or more service specifications of the service based on the first, second, third, fourth and fifth sets of one or more data elements being in the first, second, third, fourth, and fifth categories, respectively.

17. The program product of claim 13, wherein the method further comprises the step of:

the computer system specifying a fifth set of one or more data elements as being in a fifth category, wherein the fifth category specifies extension pattern elements that include patterns selected from the group consisting of: a name-value pattern, a type pattern, a multi level multi type pattern, and combinations thereof, and wherein the first, second, third, fourth, and fifth sets of one or more data elements are mutually exclusive.

18. The program product of claim 17, wherein the method further comprises the step of:

during the service specification phase of the SOA life cycle, the computer system generating one or more service specifications of the service based on the first, second, third, fourth and fifth sets of one or more data elements being in the first, second, third, fourth, and fifth categories, respectively.

19. A process for supporting computing infrastructure, the process comprising:

a first computer system providing at least one support service for at least one of creating, integrating, hosting, maintaining, and deploying computer-readable code in a second computer system comprising a processor, wherein the code, when carried out by the processor, causes the second computer system to specify a method of specifying categories of data elements during a service specification phase of a service-oriented architecture (SOA) life cycle defined in a service modeling methodology, wherein the method comprises the step of:

during the service specification phase of the SOA life cycle defined in the service modeling methodology, the second computer system specifying first, second, third and fourth sets of one or more data elements included in a plurality of data elements specific to a service as being in a first, second, third and fourth categories, respectively, wherein the first category specifies transaction elements that provide information required to be sent in a response to a request for the service and that are required for integrating applications, wherein the second category specifies glue elements that associate an operation of the service to middleware elements, wherein the third category specifies core Common Information Model (CIM) elements, and wherein the fourth category specifies extension elements that extend the core CIM elements.

20. The process of claim 19, wherein the method further comprises the step of:

during the service specification phase of the SOA life cycle, the second computer system generating one or more service specifications of the service based on the first, second, third and fourth sets of one or more data elements being in the first, second, third, and fourth categories, respectively.

* * * * *